UNITED STATES PATENT OFFICE.

CARL LUCKOW, OF COLOGNE, GERMANY.

METHOD OF REGENERATING STORAGE BATTERIES.

990,661.

Specification of Letters Patent.    Patented Apr. 25, 1911.

No Drawing.    Application filed October 26, 1909. Serial No. 524,704.

*To all whom it may concern:*

Be it known that I, CARL LUCKOW, a citizen of the Empire of Germany, residing at Cologne-on-the-Rhine, in the Empire of Germany, have invented a new and useful Method of Regenerating Storage Batteries, of which the following is a specification.

My invention consists of an improved method of regenerating storage batteries of the ordinary lead type, which show a decrease of their storage capacity due to defilement (by formation of sulfates), to shrinkage of the active materials, or to other reasons.

In my British patent specification No. 11,353 of the year 1905 I have described a process for regenerating electric accumulators, which consists in first discharging from the cells the sulfuric acid that had served as an electrolyte, then cleaning the cells, next filling them with a very dilute solution of a metallic salt, and submitting the spoiled electrodes to electrolysis with a current of about 15 to 20 amperes to the square meter of the surface of the positive electrode at a pressure of about 2 to 3 volts, the current passing first through the cells for about 4 to 8 days in the opposite direction to a charge and afterward for 3 to 6 days in the opposite direction, after which the salt solution is replaced by the usual electrolyte. Modifications of the process are described in the said specification.

A simplified process has been proposed, in which the dilute solution of the metallic salt according to my said patent specification is dispensed with and in its place water is employed, which is rendered conductive by taking up the residues of the sulfuric acid contained in the cells. Then a current of suitable strength is passed through first in the direction opposite to the charging direction for a sufficient length of time, and afterward in the opposite direction, until the regeneration is completed, after which the regenerating electrolyte is replaced by the working electrolyte.

The improvement according to my present invention consists in that after the current has passed through the cells in a direction opposite to the charging direction, the electrolyte is turned into a more or less concentrated watery solution of a suitable salt or saline combination, and then the current is reversed and passed through the cells in the opposite direction, until the regeneration is completed, after which the electrolyte is replaced by the usual electrolyte.

An example of carrying the improved method into effect is as follows: Assume that a storage battery with lead electrodes and a watery solution of sulfuric acid of about from 1.15 to 1.25 specific weight as electrolyte shows a decrease of its capacity in consequence of the formation of sulfates from the active electrode masses and of the shrinkage of the latter. Then the solution of sulfuric acid is removed from the cells and is replaced by water which by taking up the residues of the sulfuric acid from the electrodes, the insulators, the walls and the bottoms of the cells becomes sufficiently conductive. Then afterward a current of about from 25 to 50 amperes per square meter of the surface of the positive electrode is passed through the storage battery at a pressure of from 2 to 3 volts in the cells in a direction opposite to that in which the current is passed through the battery for charging it. The current is passed through for about from 120 to 240 hours. Thereby the lead peroxid of the positive electrodes will be turned into fungous lead, while the shrunk fungous lead of the negative electrodes will be thoroughly loosened and changed into lead peroxid; at the same time the sulfuric acid of the lead sulfate is expelled and dissolved in the water. Care should be taken, that the percentage of the sulfuric acid in the water only amounts to about from one to two grams of $SO_3$ per liter of water and is not permitted to exceed about five grams of $SO_3$ per liter, a higher percentage being avoided by diluting the solution, further care being also taken to equalize as far as possible with the aid of an aerometer the percentage of sulfuric acid in all of the cells by pouring in either water or sulfuric acid. After finishing the transformation of the electrodes about from 100 to 150 grams of sulfate of sodium (when calculating the latter to be free from water) per liter of the sulfuric water contained in the cells is dissolved in it, and after this salt has been completely dissolved, the density of the electrolyte (the reaction of which is best made a little acidic by $H_2SO_4$) in all of the cells is carefully equalized. Then the storage battery is subjected to electrolysis for about from 60 to 120 hours by passing a current through it in the opposite direction to that in which the current had passed during the first part of this process, so that the positive electrodes are again changed into lead peroxid and the negative electrodes into fungous lead. Then the solution is removed by allowing it to run off from the cells, after which the cells are filled with the sulfuric acid which serves as the ordinary electrolyte. After a few discharges and charges the storage battery will no more show any decrease of capacity.

Where so preferred, the introduction of the sulfate of sodium into the sulfuric water may take place after the electrodes have been discharged and recharged in the acidified water with polarities reversed, only at that moment at which during the passage of the current through the storage battery in a direction opposite to that maintained during the preceding operation the energy previously stored up has been consumed through the transformation of the electrodes, i. e. when the zero point is crossed and the battery is completely discharged and the pressure commences to rise again, since the electrodes again store up energy. The said moment is attained within a short time (from half an hour to one hour) after the direction of the current has been reversed, then the sulfate of sodium is introduced into the sulfuric water.

I claim:

1. The herein described method of regenerating storage batteries with lead electrodes, which comprises first replacing the electrolyte by water and allowing the latter to become conductive by taking up the residues of the electrolyte, then passing a current through the battery in a direction opposite to the charging direction until the lead peroxid of the positive electrodes is turned into fungous lead and the shrunk fungous lead of the negative electrodes is loosened and changed into lead peroxid, next turning the acidified water into a saline solution of a predetermined specific weight by the introduction of a salt then passing a current through the battery in the opposite direction until the electrodes are retransformed, and at last replacing the concentrated solution by the working electrolyte.

2. The herein described method of regenerating storage batteries with lead electrodes, which consists in first replacing the electrolyte by water and allowing the latter to become conductive by taking up the residues of the electrolyte, then passing a current through the battery in a direction opposite to the charging direction until the lead peroxid of the positive electrodes is turned into fungous lead and the shrunk fungous lead of the negative electrodes is loosened and changed into lead peroxid, next passing the current through the battery in a discharging direction until the zero point is crossed, thereupon turning the acidified water into a saline solution of a predetermined specific weight by the introduction of a salt then passing the current through the battery in the charging direction until the electrodes are retransformed, and at last replacing the concentrated solution by the working electrolyte.

3. The herein described method of regenerating storage batteries with lead electrodes, which comprises first replacing the electrolyte by water and allowing the latter to become conductive by taking up the residues of the electrolyte, then passing a current through the battery in a direction opposite to the charging direction until the lead peroxid of the positive electrodes is turned into fungous lead and the shrunk fungous lead of the negative electrodes is loosened and changed into lead peroxid, next turning the sulfuric water into a concentrated solution of a predetermined specific weight by the introduction of sulfate of sodium, then passing a current through the battery in the opposite direction until the electrodes are retransformed, and at last replacing the concentrated solution by the working electrolyte.

4. The herein described method of regenerating storage batteries with lead electrodes, which consists in first replacing the electrolyte by water and allowing the latter to become conductive by taking up the residues of the electrolyte, then passing a current through the battery in a direction opposite to the charging direction until the lead peroxid of the positive electrodes is turned into fungous lead and the shrunk fungous lead of the negative electrodes is loosened and changed into lead peroxid, next passing the current through the battery in a discharging direction until the zero point is crossed, thereupon turning the acidified water into a concentrated solution of a predetermined specific weight by the introduction of sulfate of sodium then passing a current through the battery in the charging direction until the electrodes are retransformed, and at last replacing the concentrated solution by the working electrolyte.

In testimony whereof I affix my signature in presence of two witnesses.

CARL LUCKOW.

Witnesses:
 CARL SIEGER,
 LOUIS VANDORN.